US012783511B1

(12) United States Patent
Mitchell

(10) Patent No.: US 12,783,511 B1
(45) Date of Patent: Nov. 3, 2026

(54) SYSTEMS AND METHODS FOR EXTRACTING DATA FROM AND VALIDATING QUERY FILTERS APPLIED TO NESTED DATAFRAMES

(71) Applicant: State Farm Mutual Automobile Insurance Company, Bloomington, IL (US)

(72) Inventor: Hunter Mitchell, Scottsdale, AZ (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 19/250,927

(22) Filed: Jun. 26, 2025

(51) Int. Cl.
*G06F 7/00* (2006.01)
*G06F 16/2452* (2019.01)

(52) U.S. Cl.
CPC .............................. *G06F 16/24524* (2019.01)

(58) Field of Classification Search
CPC .... G06F 16/358; G06F 16/148; G06F 16/137; G06F 16/152; G06F 16/56; G06F 16/538; G06F 16/278; G06F 16/256; G06F 16/164; G06F 16/1752; G06F 16/113; G06F 16/35; G06F 16/735; G06F 16/738; G06F 16/7867; G06F 16/214; G06F 16/215; G06F 16/906; G06F 16/90335; G06F 16/951; G06F 16/2329; G06F 16/2365; G06F 16/9577; G06F 16/953; G06F 16/285; G06F 16/288; G06F 16/2237; G06F 16/9538; G06F 16/9014; G06F 16/338; G06F 16/9535; G06F 16/248; G06F 16/243; G06F 16/44; G06F 16/24524; G06F 16/2255; G06F 16/3347; G06F 16/3344; G06F 16/332; G06F 16/3322; G06F 16/2456; G06F 16/2465; G06F 16/2471; G06F 16/24575; G06F 16/24578; G06F 16/2453; G06F 16/2457; G06F 16/24522; G06F 40/40; G06F 40/205; G06F 40/211; G06F 40/30; G06F 40/28; G06F 40/289; G06F 40/168; G06F 40/193; G06F 40/382
See application file for complete search history.

(56) References Cited

U.S. PATENT DOCUMENTS

| | | | |
|---|---|---|---|
| 4,459,678 | A | 7/1984 | McCaskill et al. |
| 4,606,002 | A | 8/1986 | Waisman et al. |
| 4,811,199 | A | 3/1989 | Kuechler et al. |
| 4,817,036 | A | 3/1989 | Millett et al. |
| 4,961,139 | A | 10/1990 | Hong et al. |

(Continued)

*Primary Examiner* — Mohammad A Sana
(74) *Attorney, Agent, or Firm* — Armstrong Teasdale LLP

(57) ABSTRACT

A computer system may be provided. The computer system may include at least one processor programmed to: (a) receive an input defining (i) at least one specified dataframe, (ii) one or more query filters, and (iii) one or more sets of one or more columns, each of the sets associated with at least one of the query filters; (b) generate a first map identifying (i) a list of non-nested columns of the at least one specified dataframe, and (ii) a list of nested columns of the at least one specified dataframe; (c) generate a second map including (i) the query filters associated with the set (ii) a list of non-nested columns, and (iii) a list of nested columns; and/or (d) generate an exploded dataframe from the at least one specified dataframe at least in part by exploding at least one nested column from the list of nested columns.

20 Claims, 7 Drawing Sheets

(56) References Cited

U.S. PATENT DOCUMENTS 5,428,774 A 6/1995 Takahashi et al.
5,446,575 A 8/1995 Lysakowski, Jr.
5,446,881 A 8/1995 Mammel, Jr.
5,530,854 A 6/1996 Emery et al.
5,555,409 A 9/1996 Leenstra, Sr. et al.
5,613,110 A 3/1997 Stuart
5,680,605 A 10/1997 Torres
5,710,915 A 1/1998 McElhiney
5,829,006 A 10/1998 Parvathaneny et al.
5,845,284 A 12/1998 Robinson
5,852,822 A 12/1998 Srinivasan et al.
6,105,017 A 8/2000 Kleewein et al.
6,298,339 B1 10/2001 Bjoernson
6,377,942 B1 4/2002 Hinsley et al.
6,493,717 B1 12/2002 Junkin
6,553,383 B1 4/2003 Martin
6,615,219 B1 9/2003 Bruso et al.
6,961,725 B2 11/2005 Yuan et al.
7,003,722 B2 * 2/2006 Rothchiller ........... G06F 40/143 715/236
7,007,003 B1 2/2006 Rybicki
7,007,033 B1 2/2006 Rothschiller et al.
7,020,661 B1 3/2006 Cruanes et al.
7,096,224 B2 8/2006 Murthy et al.
7,185,018 B2 2/2007 Archbold et al.
7,231,387 B2 6/2007 Sauermann et al.
7,310,638 B1 12/2007 Blair
7,337,192 B2 2/2008 Stark et al.
7,418,098 B1 8/2008 Mattsson et al.
7,447,682 B2 11/2008 Ng et al.
7,496,572 B2 2/2009 Blaicher
7,596,573 B2 9/2009 Owen
7,610,292 B2 10/2009 Krieg
7,694,068 B1 4/2010 Rosman
7,734,576 B2 6/2010 Simon et al.
7,836,037 B2 11/2010 Renkes et al.
7,853,625 B2 12/2010 Charters
7,856,457 B1 12/2010 Klein et al.
7,870,114 B2 1/2011 Zhang et al.
7,882,132 B2 2/2011 Ghatare
7,890,532 B2 2/2011 Cole et al.
7,912,869 B1 3/2011 Jas
7,917,463 B2 3/2011 Dagum et al.
8,005,854 B2 8/2011 Chawla et al.
8,019,768 B1 9/2011 Steigerwald et al.
8,065,262 B2 11/2011 Bailey
8,086,598 B1 12/2011 Lamb et al.
8,108,396 B2 1/2012 Peterson
8,108,411 B2 1/2012 Uppala et al.
8,108,431 B1 1/2012 Guner et al.
8,122,008 B2 2/2012 Li et al.
8,135,716 B2 3/2012 Stork et al.
8,185,689 B1 5/2012 Iyengar et al.
8,266,160 B2 9/2012 Listou
8,276,111 B2 9/2012 Ostrovsky et al.
8,359,329 B2 1/2013 Parson
8,423,594 B2 4/2013 Fulton et al.
8,429,133 B2 4/2013 Lahiri et al.
8,583,678 B2 11/2013 Vainer et al.
8,583,696 B2 11/2013 Jhingan
8,615,526 B2 12/2013 Sinha et al.
8,700,612 B2 4/2014 Schwob
8,738,296 B2 5/2014 Halpern et al.
8,775,448 B2 7/2014 Tuatini et al.
8,799,228 B2 8/2014 Pan et al.
8,943,068 B2 1/2015 Mizell
8,949,189 B2 2/2015 Kulkarni et al.
8,959,090 B1 2/2015 Sacco
9,058,344 B2 6/2015 Barber et al.
9,104,726 B2 8/2015 Simon
9,146,984 B1 9/2015 Bozkaya et al.
9,213,782 B2 12/2015 Boh et al.
9,292,544 B2 3/2016 Binstock et al.
9,336,327 B2 5/2016 Melnik et al.
9,367,585 B2 6/2016 Nie et al.
9,405,507 B2 8/2016 Simonson et al.
9,471,711 B2 10/2016 Abadi et al.
9,639,542 B2 5/2017 Kumar et al.
9,830,319 B1 11/2017 Tortosa et al.
9,886,474 B2 2/2018 De Smet et al.
9,959,295 B1 5/2018 Kapoor et al.
10,042,876 B2 8/2018 Derby et al.
10,061,757 B2 8/2018 Balakrishnan et al.
10,061,801 B2 8/2018 Challapalli et al.
10,078,648 B1 9/2018 Fortson et al.
10,095,722 B1 10/2018 Gopalakrishnan et al.
10,114,867 B2 10/2018 Marcotte et al.
10,152,511 B2 12/2018 Rajan et al.
10,255,234 B2 4/2019 Booman et al.
10,275,475 B2 4/2019 Tsirogiannis et al.
10,289,628 B2 5/2019 Padsalgi et al.
10,417,611 B2 9/2019 Collins et al.
10,445,349 B2 10/2019 Konik et al.
10,515,231 B2 12/2019 Wall
10,565,176 B2 2/2020 Brodt et al.
10,606,816 B2 3/2020 Dickie
10,621,153 B2 4/2020 Transier et al.
10,747,783 B2 8/2020 Pounds et al.
10,762,087 B2 9/2020 Cao et al.
10,810,198 B2 10/2020 Hopeman, IV et al.
10,831,794 B2 11/2020 Menendez
10,866,942 B1 12/2020 Russakovsky
10,866,973 B2 12/2020 Barbas et al.
10,877,998 B2 12/2020 Jagannatha et al.
10,885,011 B2 1/2021 Kusumura et al.
10,997,211 B2 5/2021 Merriman et al.
11,042,516 B2 6/2021 Vandiver et al.
11,194,797 B2 12/2021 Canim et al.
11,321,330 B1 5/2022 Pandis et al.
11,341,135 B2 5/2022 Chamarthy et al.
11,354,093 B1 6/2022 Thabit
11,392,600 B2 7/2022 Pishe et al.
11,409,747 B2 8/2022 Fu
11,436,249 B1 9/2022 Zhang et al.
11,461,545 B2 10/2022 Honsowetz
11,481,364 B2 10/2022 Zhu et al.
11,500,862 B2 11/2022 Schauder
11,500,886 B2 11/2022 Rooney et al.
11,514,004 B2 11/2022 Teyer
11,514,062 B2 11/2022 Chen et al.
11,550,792 B2 1/2023 Halstead et al.
11,567,920 B2 1/2023 Gilbert et al.
11,632,125 B2 4/2023 Leighton et al.
11,675,760 B2 6/2023 Dutta et al.
11,693,839 B2 7/2023 Li et al.
11,709,814 B2 7/2023 Agrawal et al.
11,726,995 B2 8/2023 Picard et al.
11,727,203 B2 8/2023 Kusumura et al.
11,741,104 B2 8/2023 Baptist
11,847,115 B2 12/2023 Tabb et al.
11,849,007 B2 12/2023 Picard et al.
11,853,400 B2 12/2023 Green et al.
11,868,328 B2 1/2024 Karlberg et al.
11,907,216 B2 2/2024 Zhou
11,907,263 B1 * 2/2024 Budalakoti ........... G06F 16/217
11,983,182 B2 5/2024 Iyer et al.
12,001,416 B1 6/2024 Cwalina et al.
12,013,831 B2 6/2024 Agrawal et al.
12,013,969 B2 6/2024 Blum et al.
12,072,775 B2 8/2024 Waplington et al.
12,086,119 B2 9/2024 Kim et al.
12,093,233 B2 9/2024 Winslow
12,111,874 B1 10/2024 Beckert et al.
12,147,487 B2 11/2024 Waplington
12,189,595 B2 1/2025 Szymański et al.
12,189,822 B2 1/2025 Blum et al.
12,197,436 B2 1/2025 Trigonakis et al.
12,216,648 B1 * 2/2025 Chintala ............... G06F 16/128
12,271,375 B2 4/2025 Brian
2001/0018684 A1 8/2001 Mild et al.
2001/0047372 A1 11/2001 Gorelik et al.
2002/0174125 A1 11/2002 Lucovsky et al.
2003/0120651 A1 6/2003 Bernstein et al.
2004/0034651 A1 2/2004 Gupta et al.

(56) References Cited

U.S. PATENT DOCUMENTS

2004/0036719 A1 2/2004 Van Treeck
2004/0128307 A1 7/2004 Repici
2004/0148278 A1 7/2004 Milo et al.
2004/0181512 A1 9/2004 Burdick et al.
2004/0243555 A1 12/2004 Bolsius et al.
2005/0160078 A1 7/2005 Benson et al.
2005/0187897 A1 8/2005 Pawar et al.
2006/0010106 A1 1/2006 Gerea et al.
2006/0020619 A1 1/2006 Netz et al.
2006/0085451 A1 4/2006 Pal et al.
2006/0167880 A1 7/2006 Meijer et al.
2006/0195427 A1 8/2006 Kilroy
2007/0038618 A1 2/2007 Kosciusko et al.
2007/0122118 A1 5/2007 Seo et al.
2008/0016322 A1 1/2008 Biedenstein et al.
2008/0046474 A1 2/2008 Sismanis
2008/0141182 A1 6/2008 Barsness et al.
2008/0154938 A1 6/2008 Cheslow
2008/0189258 A1 8/2008 Miejer et al.
2008/0189277 A1 8/2008 Meijer et al.
2008/0189303 A1 8/2008 Bush et al.
2008/0313204 A1 12/2008 Schultz et al.
2008/0319969 A1 12/2008 Dettinger et al.
2009/0024590 A1 1/2009 Sturge et al.
2009/0094258 A1 4/2009 Chen et al.
2009/0132621 A1 5/2009 Jensen et al.
2009/0282073 A1 11/2009 Roden
2010/0077137 A1 3/2010 Soemo et al.
2010/0179954 A1 7/2010 Chen et al.
2010/0185588 A1 7/2010 Grigorian
2010/0223240 A1 9/2010 Cooper
2011/0191407 A1 8/2011 Fu et al.
2011/0231397 A1 9/2011 Van Megchelen
2011/0252002 A1 10/2011 Ben-Dyke et al.
2012/0016901 A1 1/2012 Agarwal et al.
2012/0109875 A1 5/2012 Sundaram et al.
2012/0143890 A1 6/2012 Lee
2012/0323927 A1 12/2012 Froemmgen
2013/0166568 A1 6/2013 Binkert et al.
2013/0198199 A1 8/2013 Longshaw
2013/0275362 A1 10/2013 Nagel et al.
2013/0325874 A1 12/2013 Weyerhaeuser et al.
2014/0229489 A1 8/2014 Low et al.
2014/0258212 A1 9/2014 Kunert et al.
2014/0280032 A1 9/2014 Kornacker et al.
2015/0033032 A1 1/2015 Furukawa
2015/0088809 A1 3/2015 Kociubes et al.
2015/0134598 A1 5/2015 Banerjee et al.
2015/0324399 A1 11/2015 Tyercha et al.
2016/0085832 A1 3/2016 Lam
2016/0092508 A1 3/2016 Ivchenko
2016/0162480 A1 6/2016 Schaerges et al.
2016/0335295 A1 11/2016 Desai et al.
2016/0335363 A1 11/2016 Fish
2017/0024435 A1 1/2017 Kociubes et al.
2017/0039217 A1 2/2017 Srivas et al.
2017/0185668 A1* 6/2017 Convertino ............. G06F 17/18
2017/0193128 A1* 7/2017 Alsubaiee ............... G06F 16/86
2018/0189397 A1 7/2018 Norman
2019/0057133 A1 2/2019 Chainani et al.
2019/0108260 A1 4/2019 Zhitomirsky et al.
2019/0155930 A1 5/2019 Fender et al.
2019/0179933 A1 6/2019 Wang et al.
2019/0188300 A1 6/2019 Milan et al.
2019/0228090 A1 7/2019 Pilz et al.
2019/0272315 A1 9/2019 Walia et al.
2020/0057754 A1 2/2020 Willcock et al.
2020/0065507 A1 2/2020 Sen
2020/0125751 A1* 4/2020 Hariharasubrahmanian ................ H04L 9/3247
2020/0159707 A1 5/2020 Baskett et al.
2020/0334404 A1 10/2020 Ibañez Martinez et al.
2021/0004388 A1 1/2021 Starr et al.
2021/0019287 A1 1/2021 Prasad et al.
2021/0034592 A1 2/2021 Punti
2021/0034615 A1 2/2021 Chen et al.
2021/0081169 A1 3/2021 Verma
2021/0089537 A1 3/2021 Hanson et al.
2021/0149869 A1 5/2021 von Drakk
2022/0067105 A1 3/2022 Vodovotz et al.
2022/0107922 A1 4/2022 Krishnamoorthy et al.
2022/0229826 A1 7/2022 Srinivasulu et al.
2022/0270005 A1 8/2022 Panigrahi et al.
2022/0358128 A1 11/2022 Allahverdiyev et al.
2023/0029643 A1 2/2023 Singh et al.
2023/0120186 A1 4/2023 Huang et al.
2023/0121493 A1 4/2023 Elliot et al.
2023/0128661 A1 4/2023 Ahmed et al.
2023/0139988 A1 5/2023 Ma et al.
2023/0161744 A1 5/2023 Abbasi et al.
2023/0401179 A1 12/2023 Lux
2024/0134913 A1 4/2024 Wright et al.
2024/0265012 A1 8/2024 Gladwin et al.
2024/0311399 A1 9/2024 McCluskey et al.
2024/0338353 A1 10/2024 Gould et al.
2024/0354294 A1 10/2024 Rosi
2024/0378183 A1 11/2024 Du
2025/0124007 A1 4/2025 Lazar

* cited by examiner

SYSTEMS AND METHODS FOR EXTRACTING DATA FROM AND VALIDATING QUERY FILTERS APPLIED TO NESTED DATAFRAMES

FIELD OF USE

The present disclosure relates to relational database management systems, more particularly, to a computer system and computer implemented method configured for extracting data from and validating query filters such as Structured Query Language (SQL) filters applied to nested dataframes.

BACKGROUND

In electronic data management systems, dataframes are a common data structure used to represent tabular data. In some cases, dataframes may include complex datatype values referred to as nested values. Nested values can contain multiple different sub-values, and may include multiple different layers (e.g., each sub-value may include multiple additional sub-values), in which case the nested values may be referred to as "deeply nested" values. Generally, in order to retrieve and use data contained within nested values, the nested values must be exploded, or in other words, the dataframe must be expanded to include each sub-value of the nested value in a separate row. For dataframes with multiple nested values and/or nested values with multiple layers, this exploding process may be slow and computationally expensive.

For example, when analyzing data, it is often useful to apply filters to the data when retrieving the data (e.g., by using a SQL query). If a user desires to apply a filter to data that is contained within nested values, the nested values must first be exploded, which increases the computational expense of performing the query for the reasons described above. Additionally, such queries may sometimes include invalid filters (e.g., input filters that do not correspond to a defined category of data within the dataframe). Exploding nested values when applying a filter to data and validating filters, especially when the data is stored within the cloud, can be very time consuming and expensive to perform. Conventional techniques may include inefficiencies, ineffectiveness, encumbrances, and/or other drawbacks as well.

Accordingly, a system is needed that is configured to extract data from dataframes having nested values in response to receiving multiple or many query filters, and validate the query filters before executing the filter on the extracted data.

BRIEF SUMMARY

The present embodiments may relate to, inter alia, systems and methods for extracting data from and validating query filters such as Structured Query Language (SQL) (e.g., and other structured filters) filters applied to nested dataframes. Based upon an input including (i) a specified dataframe, (ii) one or more query filters (e.g., SQL filters) and (iii) one or more specified sets of columns of the database to keep, the system may generate an output including one or more exploded dataframes corresponding to the specified sets of columns, a key corresponding to each of the dataframes that were exploded, and/or the filters that were applied to each of the exploded dataframes. The system may further validate the one or more query filters included in the input and remove any invalid query filters before exporting data, for example, from a cloud-based architecture or other source.

When data is stored in nested columns, and particularly, in deeply nested columns, it is generally necessary to explode these nested columns in order to perform many common types of data analysis techniques on this data or to apply query filters based upon data contained within the nested columns. Conventional and/or brute force methods of extracting this data, such as by exploding all columns referenced in a query and then applying one or more query filters, can be computationally expensive because the number of rows of the exploded dataframe may expand exponentially when multiple columns are exploded. The system and method described herein greatly reduces the computational process by extracting all data needed to execute a query while performing a reduced and/or minimal number of explosions by only maintaining necessary columns in the dataframe and by generating exploded dataframes that each have, for example, only one exploded column.

In one aspect, a computer system for extracting data from and validating query filters to be applied to nested dataframes may be provided. The system may include one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and other electronic or electrical components, which may be in wired or wireless communication with one another. For example, in one instance, a computer system comprising at least one memory and at least one processor in communication with the at least one memory is provided. The at least one processor may be programmed to: (a) receive an input defining (i) at least one specified dataframe, (ii) one or more query filters, and (iii) one or more sets of one or more columns, each of the one or more sets of the one or more columns associated with at least one of the one or more query filters; (b) generate a first map including, for each query filter of the one or more query filters, a first mapping identifying (i) a list of non-nested columns of the at least one specified dataframe associated with the query filter, and (ii) a list of nested columns of the at least one specified dataframe associated with the query filter; (c) generate, based in part upon the first map, a second map including, for each set of the one or more sets of the one or more columns, a second mapping including (i) the one or more query filters associated with the set, (ii) a list of non-nested columns associated with the set or with the one or more query filters associated with the set, and (iii) a list of nested columns associated with the one or more query filters associated with the set; (d) for each second mapping, generate an exploded dataframe from the at least one specified dataframe at least in part by exploding at least one nested column from the list of nested columns corresponding to the second mapping; and/or (e) cause the exploded dataframe generated for each second mapping to be displayed. The computer system may perform additional, less, or alternate functionality, including that discussed elsewhere herein.

In another aspect, a computing device for extracting data from and validating query filters to be applied to nested dataframes be provided. The computing device may include one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and other electronic or electrical components, which may be in wired or wireless communication with one another. For example, in one instance, a computing device may comprise at least one memory and at least one processor in communication with the at least one memory. The at least one processor may be programmed to: (a) receive an input defining (i) at least one specified dataframe, (ii) one or more query filters, and (iii) one or more sets of one or more columns, each of the one or more sets of the one or more columns associated with at least one of the one or more query filters; (b) generate a first map including, for each query filter of the one or more query filters, a first mapping identifying (i) a list of non-nested columns of the at least one specified dataframe associated with the query filter, and (ii) a list of nested columns of the at least one specified dataframe associated with the query filter; (c) generate, based in part upon the first map, a second map including, for each set of the one or more sets of the one or more columns, a second mapping including (i) the one or more query filters associated with the set, (ii) a list of non-nested columns associated with the set or with the one or more query filters associated with the set, and (iii) a list of nested columns associated with the one or more query filters associated with the set; (d) for each second mapping, generate an exploded dataframe from the at least one specified dataframe at least in part by exploding at least one nested column from the list of nested columns corresponding to the second mapping; and/or (e) cause the exploded dataframe generated for each second mapping to be displayed. The computing device may perform additional, less, or alternate functionality, including that discussed elsewhere herein.

In yet another aspect, a computer-implemented method for extracting data from and validating query filters to be applied to nested dataframes may be provided. The computer-implemented method may be performed by one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and other electronic or electrical components, which may be in wired or wireless communication with one another. The computer-implemented method may include: (a) receiving an input defining (i) at least one specified dataframe, (ii) one or more query filters, and (iii) one or more sets of one or more columns, each of the one or more sets of the one or more columns associated with at least one of the one or more query filters; (b) generating a first map including, for each query filter of the one or more query filters, a first mapping identifying (i) a list of non-nested columns of the at least one specified dataframe associated with the query filter, and (ii) a list of nested columns of the at least one specified dataframe associated with the query filter; (c) generating, based in part upon the first map, a second map including, for each set of the one or more sets of the one or more columns, a second mapping including (i) the one or more query filters associated with the set, (ii) a list of non-nested columns associated with the set or with the one or more query filters associated with the set, and (iii) a list of nested columns associated with the one or more query filters associated with the set; (d) for each second mapping, generating an exploded dataframe from the at least one specified dataframe at least in part by exploding at least one nested column from the list of nested columns corresponding to the second mapping; and/or (e) causing the exploded dataframe generated for each second mapping to be displayed. The computer-implemented method may include additional, less, or alternate functionality, including that discussed elsewhere herein.

In still another aspect, a non-transitory computer-readable media for extracting data from and validating query filters to be applied to nested dataframes may be provided. The non-transitory computer-readable storage media may include computer-executable instructions that may be executed by one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and other electronic or electrical components, which may be in wired or wireless communication with one another. For example, in one instance, a computer system may include at least one memory and at least one processor in communication with the at least one memory. The computer-executable instructions may cause the at least one processor to: (a) receive an input defining (i) at least one specified dataframe, (ii) one or more query filters, and (iii) one or more sets of one or more columns, each of the one or more sets of the one or more columns associated with at least one of the one or more query filters; (b) generate a first map including, for each query filter of the one or more query filters, a first mapping identifying (i) a list of non-nested columns of the at least one specified dataframe associated with the query filter, and (ii) a list of nested columns of the at least one specified dataframe associated with the query filter; (c) generate, based in part upon the first map, a second map including, for each set of the one or more sets of the one or more columns, a second mapping including (i) the one or more query filters associated with the set, (ii) a list of non-nested columns associated with the set or with the one or more query filters associated with the set, and (iii) a list of nested columns associated with the one or more query filters associated with the set; (d) for each second mapping, generate an exploded dataframe from the at least one specified dataframe at least in part by exploding at least one nested column from the list of nested columns corresponding to the second mapping; and/or (e) cause the exploded dataframe generated for each second mapping to be displayed. The non-transitory computer-readable media may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed herein. However, it should be understood that the present embodiments are not limited to the precise arrangements and/or instrumentalities shown herein.

Figure 1:
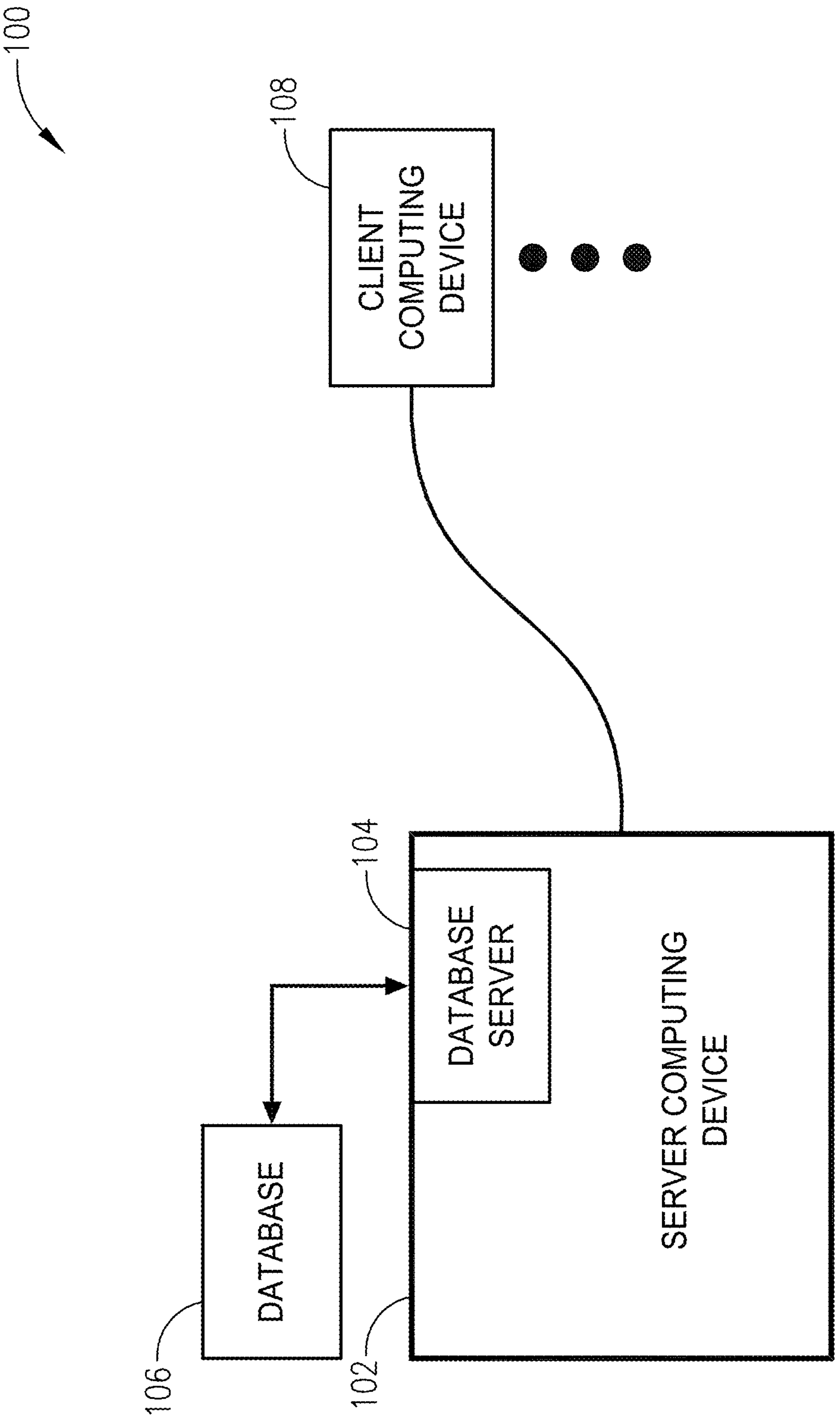
FIG. 1 depicts an exemplary computer system in accordance with an exemplary embodiment of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for extracting data from and validating query filters such as Structured Query Language (SQL) (e.g., and other structured filters) filters applied to nested dataframes. Based upon an input including (i) a specified dataframe, (ii) one or more query filters (e.g., SQL filters) and (iii) one or more specified sets of columns of the database to keep, the system may generate an output including one or more exploded dataframes corresponding to the specified sets of columns, a key corresponding to each of the dataframes that were exploded, and/or the filters that were applied to each of the exploded dataframes. The system may further validate the one or more query filters included in the input and remove any invalid query filters before exporting data from a cloud-based architecture.

A column of dataframe that includes at least one nested value may be referred to herein as a "nested column," and a dataframe including at least one nested column may be referred to as a "nested dataframe."

When data is stored in nested columns, and particularly, in deeply nested columns, it is generally necessary to explode these nested columns in order to perform many common types of data analysis techniques on this data or to apply query filters based upon data contained within the nested columns. Conventional and/or brute force methods of extracting this data, such as by exploding all columns referenced in a query and then applying one or more query filters, can be computationally expensive because the number of rows of the exploded dataframe may expand exponentially when multiple columns are exploded. The system and method described herein greatly reduces the computational process by extracting all data needed to execute a query while performing a reduced and/or minimal number of explosions by only maintaining necessary columns in the dataframe and by generating exploded dataframes that each have, for example, only one exploded column.

In exemplary embodiments, the systems and methods may be performed by a server computing device, a bank of server computing devices, and/or other computing devices, which may be in communication with one or more client computing devices. The server computing device may be part of and/or be in further communication with a database management system capable of retrieving data stored in one or more databases, which in exemplary embodiments, may include tabular databases and/or dataframes, based upon input queries. While certain functions are described herein as being performed by the server computing device according to an exemplary embodiment, it should be appreciated that the functions described herein may additionally or alternatively be performed by a client computing device, a computing component of the database management system, and/or one or more cloud computing resources. Additionally, while SQL is described as an example programming language for implementing at least some of the functions described herein, it should be appreciated that any appropriate programming languages may be used to implement the functions described herein. In some cases, these functions may be incorporated into one or more programming libraries. As described in further detail below, the server computing device may generate an output that includes one or more dataframes (e.g., individual tables) including columns or data fields specified by the query.

The server computing device may be configured and/or programmed to receive (e.g., from a client computing device or via direct user input) an input defining (i) at least one specified dataframe, (ii) one or more query filters, and (iii) one or more sets of one or more columns to be included in an output. Each of these sets of columns may cause the server computing device to generate an exploded dataframe having columns specified by the set. Each of the sets of columns may also be associated with at least one of the query filters, so that the exploded dataframe corresponding to the set may be filtered based upon the specified query filters.

In response to receiving the query, the server computing device may further be configured and/or programmed to generate a first map including, for each of the query filters included in the query, generate a first mapping identifying (i) a list of non-nested columns of the at least one specified dataframe associated with the query filter and (ii) a list of nested columns of the at least one specified dataframe associated with the query filter. In other words, the received filter queries may reference many columns, and the server computing device may identify which of these columns include nested values and which do not. The list of nested columns may be used by the server computing device to identify a key, or one or more specified columns, for each specified set of columns based upon which a corresponding dataframe may be exploded.

The server computing device may further be configured and/or programmed to, based in part upon the first map, generate a second map including, for each of the specified sets of columns, a second mapping including (i) the one or more query filters associated with the set (ii) a list of non-nested columns associated with the set or with the one or more query filters associated with the set, and (iii) a list of nested columns associated with the one or more query filters associated with the set. In other words, the second map may specify, for each set, which columns should be included in the resulting dataframe (e.g., as specified by the set itself or the filters applied to the set) and the nested column based upon which the resulting dataframe is to be exploded. This process may be performed iteratively for each of the specified set of columns.

The server computing device may further be configured and/or programmed to, for each of the second mappings, generate an exploded dataframe at least in part by exploding at least one nested column from the list of nested columns. For example, the server computing device may retrieve data for each column to be included and explode one or more nested columns specified by the second mapping. The server computing device may then cause the exploded dataframe generated for each of the second mappings to be displayed, for example, on a local display device or at a client computing device by transmitting data characterizing the generated dataframes to the client computing device. In addition to the generated exploded dataframes themselves, the key or one or more exploded columns and the filters associated with each of the generated exploded dataframes may also be displayed.

The server computing device may further be configured and/or programmed to identify one or more query filters as being based upon the generated exploded dataframes. For example, if one of the filters relates to a data field or column that is not present in the generated exploded dataframe or the dataframe from which the data in the generated exploded dataframe is derived, the filter may be determined to be invalid. Any identified invalid filters may be removed from the generated second mappings. In some embodiments, the server computing device may cause the identified invalid filters to be displayed. Additionally or alternatively, when an output including the generated exploded dataframes is displayed as described above, in some embodiments, only filters identified as being valid may be included in the output display.

The system therefore enables a query that requires data to be extracted from nested columns in a less computationally expensive manner, which may reduce the amount of time, energy, and other costs necessary to perform such queries, particularly in cases in which portions of the database management system are located remotely from where the query is initiated (e.g., when a cloud-based database management system is being used). Examples of types of data that are often stored in a nested format include insurance policy terms, business events, policy transactions, information about properties, and/or other categories of data that may include multiple different sub-types of data. The system therefore enables an efficient execution of one or more queries that include a filter to be applied to one or more of these sub-types of data.

In an example, an input may be submitted that makes reference to the data table shown below.

| id | price | bids | reviews |
|---|---|---|---|
| 1 | 1300 | [1200] | [amazing, great] |
| 2 | 980 | [970, 960] | [nice] |
| 3 | 930 | [920] | [beautiful] |

This data table includes four columns, namely, id, price, bids, and reviews. The bids and reviews columns are nested columns, in that they include nested data values, and when exploded, may be denoted using the expressions bids.bid and reviews.review, respectively. In this example, the input may specify four query filters: (1) price <1000; (2) bids.bid >900 and price >900; (3) reviews.review is not null; and (4) bedrooms=2. In this example, the input query may further specify three sets of columns to keep with corresponding filters to be applied: (1) Columns=[id, bids, reviews], Filters=[1, 4]; (2) Columns=[id], Filters=[2]; and (3) Columns=[bids], Filters=[1, 3].

In the first step, a first mapping is generated for each of the four input query filters that includes a list of non-nested and nested columns for each filter. For filter [1], [price] is the sole non-nested column and there are no nested columns. For filter [2], [price] is the sole non-nested column and [bids.bid] is the sole nested column. For filter [3], there are no non-nested columns and [reviews.review] is the sole nested column. For query filter [4], [bedrooms] is the sole non-nested column and there are no nested columns.

In the next step, a second mapping is generated iteratively for each of the three sets of columns, with each of the second mappings including the corresponding nested columns, non-nested columns, and query filters. The columns may include both those specified within the set itself and the filters applied to the set. Here, for the first set, the non-nested columns include [id], [bids], [reviews], [price], and [bedrooms], there are no nested columns, and the query filters include query filters [1] and [4]. For the second set, the non-nested columns include [id] and [price], the nested columns include [bids.bid], and the query filters include filter [2]. For the third set, the non-nested columns include [bids] and [price], the nested columns include [reviews.review], and the query filters include filters [1] and [3]. A key may be identified for each set based upon the nested columns specified by the corresponding second mapping, if present. For example, the first set would have a key of [ ] or null because no nested column is present, the second set would have a key of [bids], and the third set would have a key of [reviews]. These keys may specify how the dataframe generated for each set is exploded.

In the next step, a dataframe may be generated based upon the second mapping corresponding to each of the three sets. Specifically, the exploded dataframe may include the nested and non-nested columns of the set from the corresponding second mapping exploded based upon the columns defined in the key. In this example, the second mapping associated with the first set results in a generation of the below table, which has no exploded columns:

| id | price | bids | reviews |
|---|---|---|---|
| 1 | 1300 | [1200] | [amazing, great] |
| 2 | 980 | [970, 960] | [nice] |
| 3 | 930 | [920] | [beautiful] |

In this example, the second mapping associated with the second set results in a generation of the below table, in which the column [bids] is exploded to [bids.bid]:

| id | price | bids.bid |
|---|---|---|
| 1 | 1300 | 1200 |
| 2 | 980 | 970 |
| 2 | 980 | 960 |
| 3 | 930 | 920 |

In this example, the second mapping associated with the third set results in a generation of the below table, in which the column [reviews] is exploded to [reviews.review] (note the column [bids] includes nested data but is not exploded):

| price | bids | reviews.review |
|---|---|---|
| 1300 | [1200] | amazing |
| 1300 | [1200] | great |
| 980 | [970, 960] | nice |
| 930 | [920] | beautiful |

In the next step, invalid data filters may be identified and removed from the second mappings. In this example, query filter [4] may be identified as invalid because the column [bedrooms] specified by this filter does not exist within the data tables. Accordingly, the map for the first set may be updated to remove query filter [4]. In this example, the generated exploded dataframes may be displayed along with the corresponding keys, filters, and/or other corresponding data.

At least one of the technical problems addressed by this system may include: (i) computational inefficiency and electronic communication bandwidth inefficiency associated with extracting data from nested dataframes; (ii) computational inefficiency and electronic communication bandwidth inefficiency associated with exploding a dataframe including multiple nested columns and/or deeply nested columns; (iii) inability of a computing device to apply query filters based upon data contained within nested values; and/or (iv) inability of a computing device to identify invalid query filters from an input query to be applied to a nested dataframe.

The technical effect achieved by this system may be at least one of: (i) improving computational efficiency and electronic communication bandwidth associated with extracting data from nested dataframes by generating one or more map data structures based upon an input query and generating one or more exploded dataframes that are exploded based upon one or more columns specified by a corresponding one of the one or more map data structures; (ii) improving computational efficiency and electronic communication bandwidth associated with exploding a dataframe including multiple nested columns and/or deeply nested columns by generating one or more map data structures based upon an input query and generating one or more exploded dataframes that are exploded based upon one or more columns specified by a corresponding one of the one or more map data structures; (iii) ability for a computing device to apply query filters based upon data contained within nested values by generating one or more map data structures based upon an input query including the query filters and generating one or more exploded dataframes to which corresponding query filters may be applied that are exploded based upon a column specified by a corresponding one of the one or more map data structures; and/or (iv) ability for a computing device to identify invalid query filters from an input query to be applied to a nested dataframe by identifying the invalid query filters based upon one or more exploded dataframes generated based in part upon corresponding query filters.

Exemplary Computer System for Extracting Data from and Validating Query Filters to be Applied to Nested Dataframes FIG. 1 depicts an exemplary computer system 100 for the present disclosure. Computer system 100 may include a server computing device 102 (which may include one or more computing devices and/or one or more processors) including a database server 104. While database server 104 is illustrated as being a component of server computing device 102, in some alternative embodiments, database server 104 may be separate from server computing device 102. For example, database server 104 may be part of an external and/or cloud-based database management system. Server computing device 102 may be in communication with a database 106 via database server 104 and may be further in communication with one or more client computing devices 108 associated with one or more users.

While the exemplary embodiment described herein illustrates server computing device 102 as an example, it should be appreciated that the functions described herein may be performed by client computing device 108, database server 104, a computing component of a database management system, and/or one or more cloud computing resources. Additionally, while SQL is described as an example programming language for implementing at least some of the functions described herein, it should be appreciated that any appropriate programming languages may be used to implement the functions described herein. In some cases, these functions may be incorporated into one or more programming libraries. As described in further detail below, server computing device 102 may generate an output that includes one or more dataframes (e.g., individual tables) including columns or data fields specified by the query.

Server computing device 102 may further be configured and/or programmed to receive (e.g., from client computing device 108 or via direct user input) an input defining (i) at least one specified dataframe, (ii) one or more query filters, and (iii) one or more sets of one or more columns to be included in an output. Each of these sets of columns may cause server computing device 102 to generate an exploded dataframe having columns specified by the set. Each of the sets of columns may also be associated with at least one of the query filters, so that the exploded dataframe corresponding to the set may be filtered based upon the specified query filters.

In response to receiving the query, server computing device 102 may further be configured and/or programmed to generate a first map including, for each of the query filters included in the query, a first mapping identifying (i) a list of non-nested columns of the at least one specified dataframe associated with the query filter and (ii) a list of nested columns of the at least one specified dataframe associated with the query filter. In other words, the received filter queries may reference many columns, and server computing device 102 may identify which of these columns include nested values and which do not. The list of nested columns may be used by server computing device 102 to identify a key, or one or more specified columns, for each specified set of columns based upon which a corresponding dataframe may be exploded.

Server computing device 102 may further be configured and/or programmed to, based in part upon the first map, generate a second map including, for each of the specified sets of columns, a second mapping (i) the one or more query filters associated with the set (ii) a list of non-nested columns associated with the set or with the one or more query filters associated with the set, and (iii) a list of nested columns associated with the one or more query filters associated with the set. In other words, the second map may specify, for each set, which columns should be included in the resulting dataframe (e.g., as specified by the set itself or the filters applied to the set) and the nested column based upon which the resulting dataframe is to be exploded. This process may be performed iteratively for each of the specified set of columns.

Server computing device 102 may further be configured and/or programmed to, for each of the second mappings, generate an exploded dataframe at least in part by exploding at least one nested column from the list of nested columns. For example, server computing device 102 may retrieve data for each column to be included and explode one or more nested columns specified by the second mapping. Server computing device 102 may then cause the exploded dataframe generated for each of the second mappings to be displayed, for example, on a local display device or at client computing device 108 by transmitting data characterizing the generated dataframes to client computing device 108. In addition to the generated exploded dataframes themselves, the key or one or more exploded columns and the filters associated with each of the generated exploded dataframes may also be displayed.

Server computing device 102 may further be configured and/or programmed to identify one or more query filters as being based upon the generated exploded dataframes. For example, if one of the filters relates to a data field or column that is not present in the generated exploded dataframe or the dataframe from which the data in the generated exploded dataframe is derived, the filter may be determined to be invalid. Any identified invalid filters may be removed from the generated second mappings. In some embodiments, server computing device 102 may cause the identified invalid filters to be displayed. Additionally or alternatively, when an output including the generated exploded dataframes is displayed as described above, in some embodiments, only filters identified as being valid may be included in the output display.

Computer system 100 therefore enables a query that requires data to be extracted from nested columns in a less computationally expensive manner, which may reduce the amount of time, energy, and other costs necessary to perform such queries, particularly in cases in which portions of the database management system are located remotely from where the query is initiated (e.g., when a cloud-based database management system is being used). Examples of types of data that are often stored in a nested format include insurance policy terms, business events, policy transactions, information about properties, and/or other categories of data that may include multiple different sub-types of data. Computer system 100 therefore enables an efficient execution of one or more queries that include a filter to be applied to one or more of these sub-types of data.

Exemplary Client Computing Device

Figure 2:
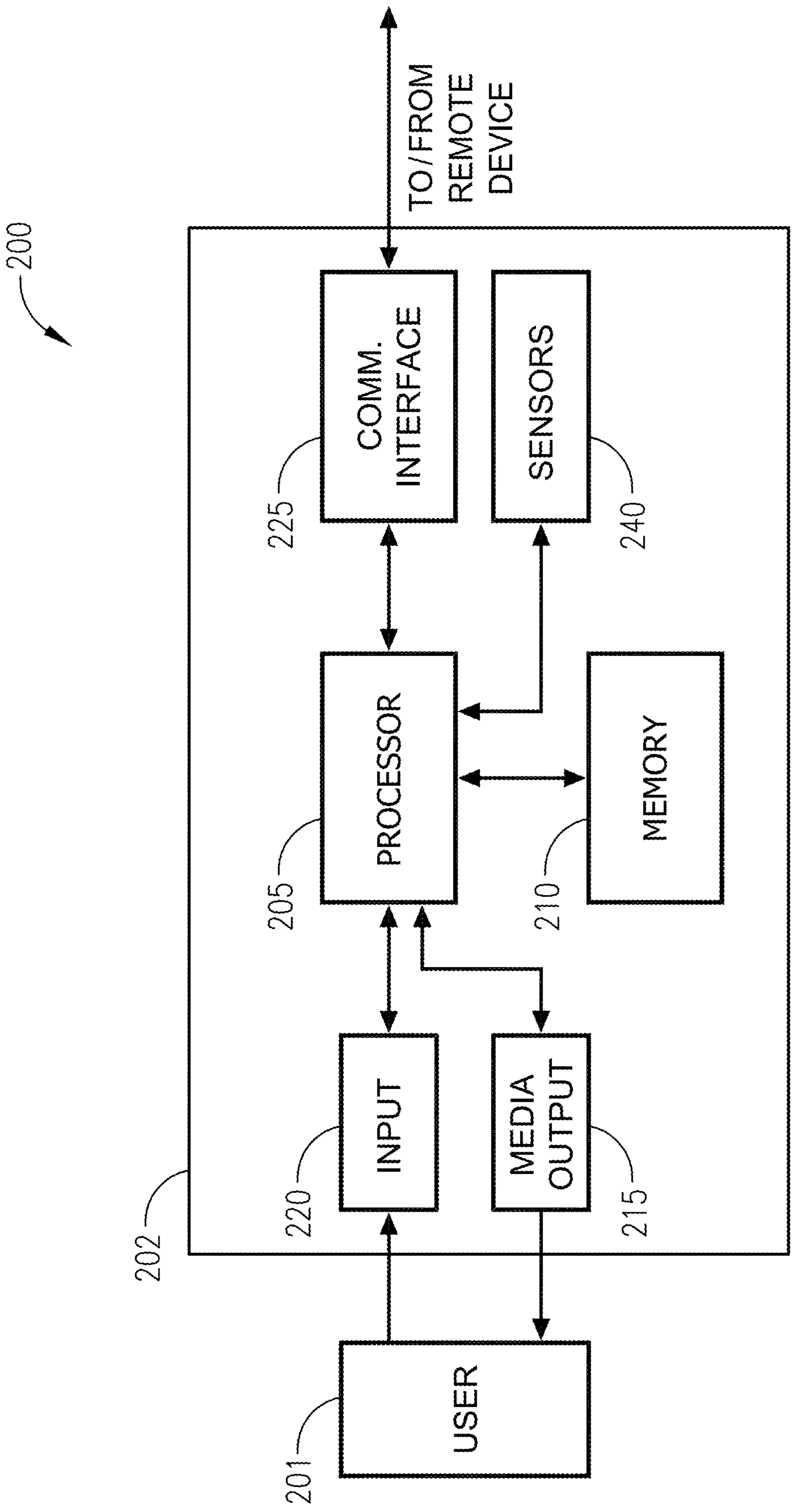
FIG. 2 depicts an exemplary client computing device that may be used with the computer system illustrated in FIG. 1 in accordance with an exemplary embodiment of the present disclosure.

FIG. 2 depicts an exemplary client system 200 including a client computing device 202. Client computing device 202 may be, for example, client computing devices 108 (shown in FIG. 1).

Client computing device 202 may include a processor 205 for executing instructions. In some embodiments, executable instructions may be stored in a memory area 210. Processor 205 may include one or more processing units (e.g., in a multi-core configuration). Memory area 210 may be any device allowing information such as executable instructions and/or other data to be stored and retrieved. Memory area 210 may include one or more computer readable media.

In certain exemplary embodiments, client computing device 202 may also include at least one media output component 215 for presenting information to a user 201. Media output component 215 may be any component capable of conveying information to user 201. In some embodiments, media output component 215 may include an output adapter such as a video adapter and/or an audio adapter. An output adapter may be operatively coupled to processor 205 and operatively couplable to an output device such as a display device (e.g., a liquid crystal display (LCD), light emitting diode (LED) display, organic light emitting diode (OLED) display, cathode ray tube (CRT) display, "electronic ink" display, or a projected display) or an audio output device (e.g., a speaker or headphones).

Client computing device 202 may also include an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

Client computing device 202 may also include a communication interface 225, which can be communicatively coupled to a remote device such as server computing device 102 (shown in FIG. 1). Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

In some embodiments, client computing device 202 may also include sensors 240. Sensors 240 may include, for example, an accelerometer, a global positioning system (GPS), or a gyroscope. Sensors 240 may be used to collect data relating to the user, which may be transmitted by client computing device 202 a remote device such as server computing device 102 (shown in FIG. 1).

Stored in memory area 210 may be, for example, computer readable instructions for providing a user interface to user 201 via media output component 215 and, optionally, receiving and processing input from input device 220. A user interface may include, among other possibilities, a web browser and client application. Web browsers may enable users, such as user 201, to display and interact with media and other information typically embedded on a web page or a website. A client application may allow user 201 to interact with a server application from server computing device 102 (shown in FIG. 1).

Memory area 210 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Server System

Figure 3:
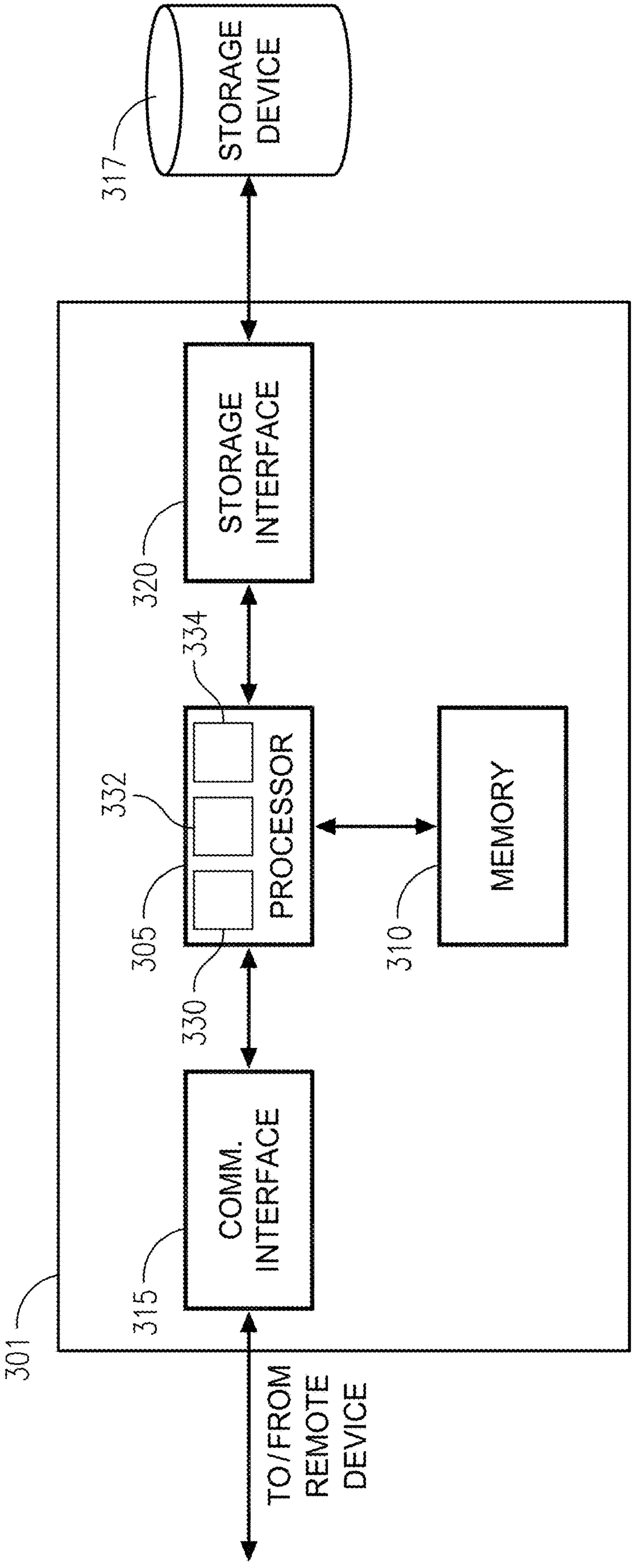
FIG. 3 depicts an exemplary server system that may be used with the computer system illustrated in FIG. 1 in accordance with an exemplary embodiment of the present disclosure.

FIG. 3 depicts an exemplary server system 300 including a server computing device 301 that may be used with computer system 100 illustrated in FIG. 1. Server computing device 301 may be, for example, server computing device 102 (shown in FIG. 1).

In exemplary embodiments, server computing device 301 may include a processor 305 for executing instructions. Instructions may be stored in a memory area 310. Processor 305 may include one or more processing units (e.g., in a multi-core configuration) for executing instructions. The instructions may be executed within a variety of different operating systems on server computing device 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 may be operatively coupled to a communication interface 315 such that server computing device 301 is capable of communicating with client computing device 108 (shown in FIG. 1), or another server computing device 301. For example, communication interface 315 may receive requests from client computing device 108 via the Internet. Further, processor 305, via communication interface 315, may be capable of causing funds to be transferred between various entities, such as, for example, accounts associated with client computing device 108 (shown in FIG. 1).

Processor 305 may also be operatively coupled to a storage device 317, such as database 106 (shown in FIG. 1). Storage device 317 may be any computer-operated hardware suitable for storing and/or retrieving data. In some embodiments, storage device 317 may be integrated in server computing device 301. For example, server computing device 301 may include one or more hard disk drives as storage device 317.

In other embodiments, storage device 317 may be external to server computing device 301 and may be accessed by a plurality of server computing device 301. For example, storage device 317 may include multiple storage units such as hard disks or solid state disks in a redundant array of inexpensive disks (RAID) configuration. Storage device 317 may include a storage area network (SAN) and/or a network attached storage (NAS) system.

In some embodiments, processor 305 may be operatively coupled to storage device 317 via a storage interface 320. Storage interface 320 may be any component capable of providing processor 305 with access to storage device 317. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 317.

In exemplary embodiments, processor 305 may include and/or be communicatively coupled to one or more modules for implementing the systems and methods described herein. For example, in some embodiments, processor 305 may include a communication module 330 configured to facilitate communication with other computing devices, a mapping module 332 configured to generate map data structures that specify how data is to be extracted from databases including nested columns, and a data management module 334 configured to execute query functions (e.g., locally and/or via communication with a remote database management system) and other database management functions.

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4A:
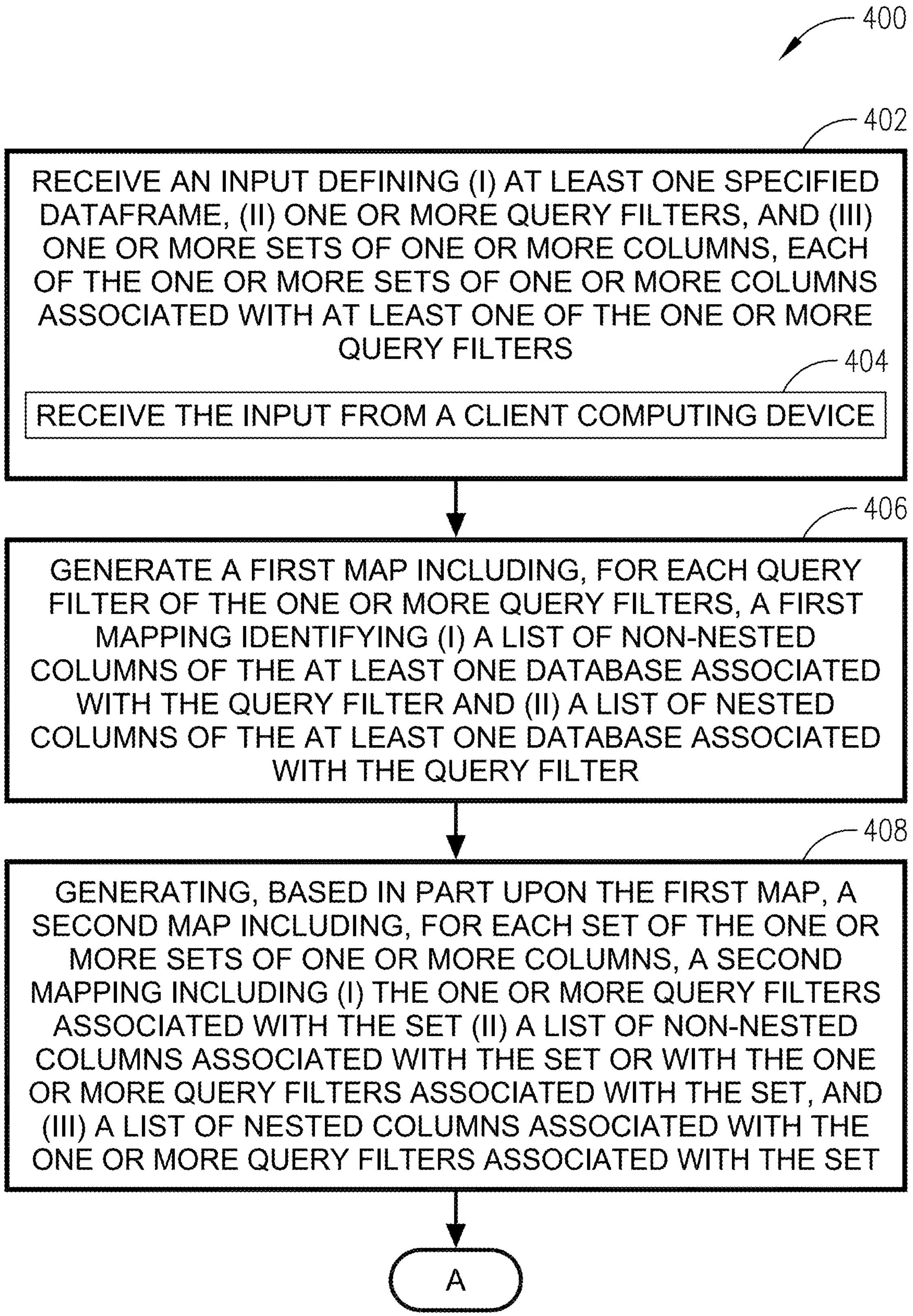
FIG. 4A is a flowchart that illustrates an exemplary computer-implemented method for extracting data from and validating query filters to be applied to nested dataframes in accordance with an exemplary embodiment of the present disclosure.
Figure 4B:
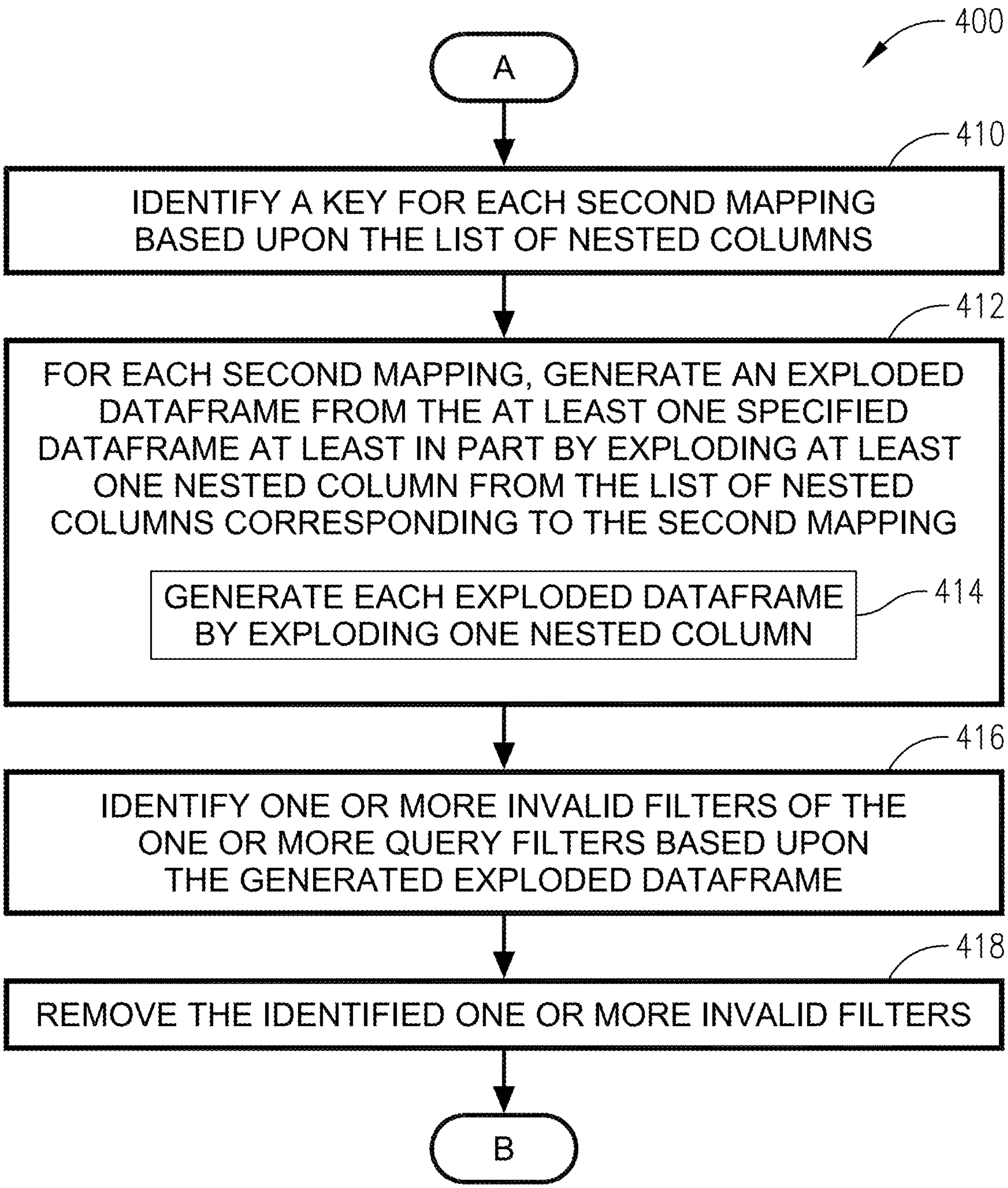
FIG. 4B is a continuation of the flowchart shown in FIG. 4A.
Figure 4C:
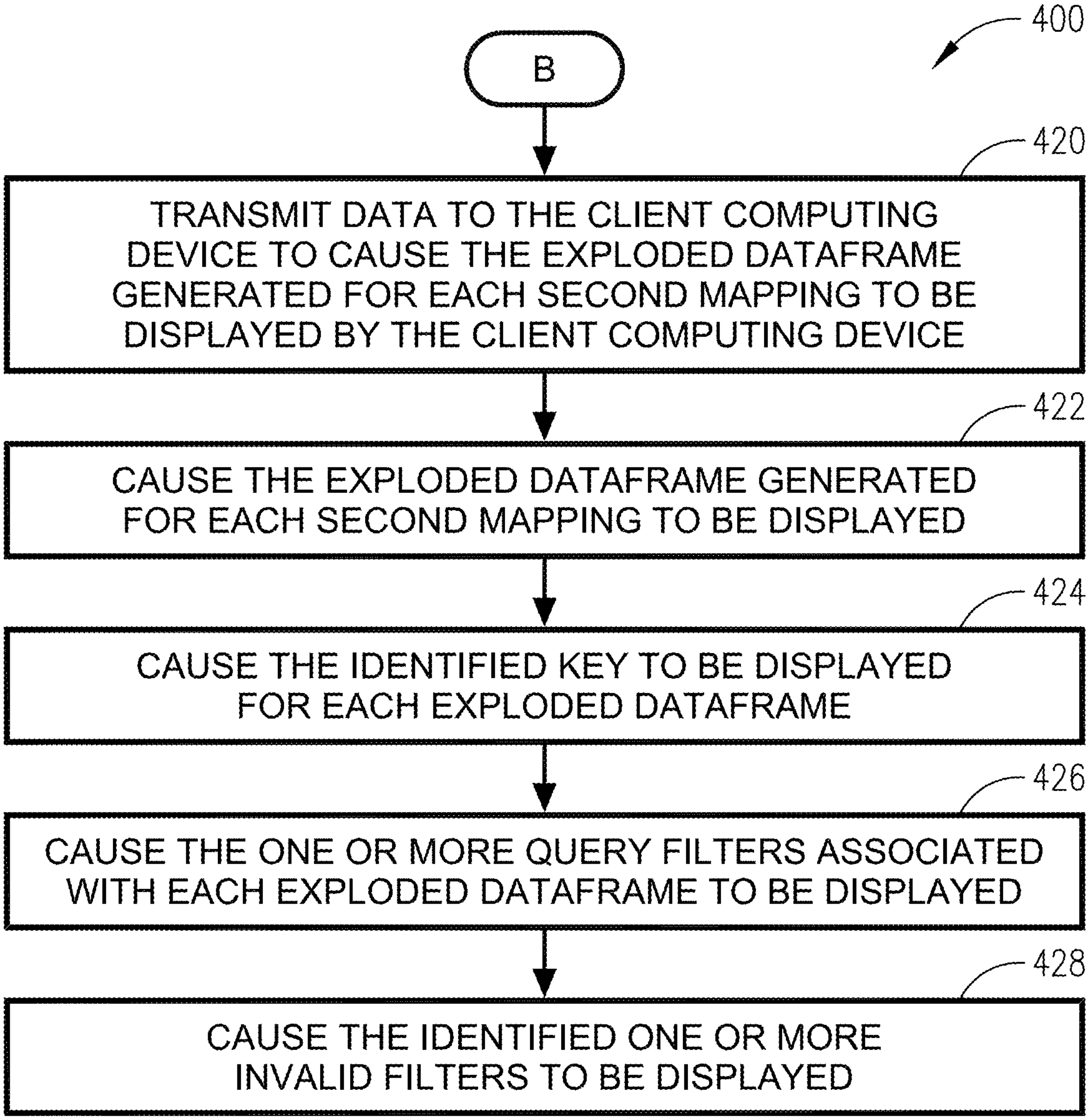
FIG. 4C is a continuation of the flowchart shown in FIGS. 4A and 4B.

Exemplary Method for Extracting Data from and Validating Query Filters to be Applied to Nested Dataframes FIGS. 4A, 4B, and 4C depict a flowchart that illustrates an exemplary computer-implemented method 400 for extracting data from and validating query filters to be applied to nested dataframes. Computer-implemented method 400 may be performed by one or more components of computer system 100 (shown in FIG. 1), such as server computing device 102.

In the exemplary embodiment, computer-implemented method 400 may include receiving (block 402) an input defining (i) at least one specified dataframe, (ii) one or more query filters, and (iii) one or more sets of one or more columns, each of the one or more sets of the one or more columns associated with at least one of the one or more query filters. In certain embodiments, receiving the query may include receiving (block 404) the input from a client computing device (such as client computing device 108). In some embodiments, the functions illustrated in block 402 and/or block 404 may be performed by server computing device 102, for example, by executing communication module 330 (shown in FIG. 3).

In the exemplary embodiment, computer-implemented method 400 may further include, generating (block 406) a first map including, for each query filter of the one or more query filters, a first mapping identifying (i) a list of non-nested columns of the at least one specified dataframe associated with the query filter and (ii) a list of nested columns of the at least one specified dataframe associated with the query filter. In some embodiments, the functions illustrated in block 406 may be performed by server computing device 102, for example, by executing mapping module 332 (shown in FIG. 3).

In the exemplary embodiment, computer-implemented method 400 may further include generating (block 408), based in part upon the first map, a second map including, for each set of the one or more sets of the one or more columns, a second mapping including (i) the one or more query filters associated with the set (ii) a list of non-nested columns associated with the set or with the one or more query filters associated with the set, and (iii) a list of nested columns associated with the one or more query filters associated with the set. In some embodiments, the functions illustrated in block 408 may be performed by server computing device 102, for example, by executing mapping module 332 (shown in FIG. 3).

In the exemplary embodiment, computer-implemented method 400 may further include identifying (block 410) at least one key for each second mapping based upon the list of nested columns. This key may identify the set of columns which will be exploded on to access these nested columns. A dataframe generated for each second mapping may be exploded based upon the identified at least one key. In some embodiments, the functions illustrated in block 410 may be performed by server computing device 102, for example, by executing mapping module 332 (shown in FIG. 3).

In the exemplary embodiment, computer-implemented method 400 may further include, for each second mapping, generating (block 412) an exploded dataframe from the at least one specified dataframe at least in part by exploding at least one nested column (e.g., identified by the at least one key) from the list of nested columns corresponding to the second mapping. In certain embodiments, generating the exploded dataframe may include generating (block 414) each exploded dataframe by exploding one nested column. In some embodiments, the functions illustrated in block 412 and/or block 414 may be performed by server computing device 102, for example, by executing data management module 334 (shown in FIG. 3).

In the exemplary embodiment, computer-implemented method 400 may further include identifying (block 416) one or more invalid filters of the one or more query filters based upon the generated exploded dataframe. In some embodiments, the functions illustrated in block 416 may be performed by server computing device 102, for example, by executing mapping module 332 (shown in FIG. 3).

In the exemplary embodiment, computer-implemented method 400 may further include, for each second mapping including the identified one or more invalid filters, removing (block 418) the identified one or more invalid filters. In some embodiments, the functions illustrated in block 418 may be performed by server computing device 102, for example, by executing mapping module 332 (shown in FIG. 3).

In the exemplary embodiment, computer-implemented method 400 may further include transmitting (block 420) data to the client computing device to cause the exploded dataframe generated for each second mapping to be displayed by the client computing device. In some embodiments, the functions illustrated in block 420 may be performed by server computing device 102, for example, by executing communication module 330 (shown in FIG. 3).

In the exemplary embodiment, computer-implemented method 400 may further include causing (block 422) the exploded dataframe generated for each second mapping to be displayed. In some embodiments, the functions illustrated in block 422 may be performed by server computing device 102, for example, by executing communication module 330 (shown in FIG. 3).

In the exemplary embodiment, computer-implemented method 400 may further include causing (block 424) the identified key to be displayed for each exploded dataframe. In some embodiments, the functions illustrated in block 424 may be performed by server computing device 102, for example, by executing communication module 330 (shown in FIG. 3).

In the exemplary embodiment, computer-implemented method 400 may further include causing (block 426) the one or more query filters associated with each exploded dataframe to be displayed. In some embodiments, the functions illustrated in block 426 may be performed by server computing device 102, for example, by executing communication module 330 (shown in FIG. 3).

In the exemplary embodiment, computer-implemented method 400 may further include causing (block 428) the identified one or more invalid filters to be displayed. In some embodiments, the functions illustrated in block 428 may be performed by server computing device 102, for example, by executing communication module 330 (shown in FIG. 3).

Figure 5:
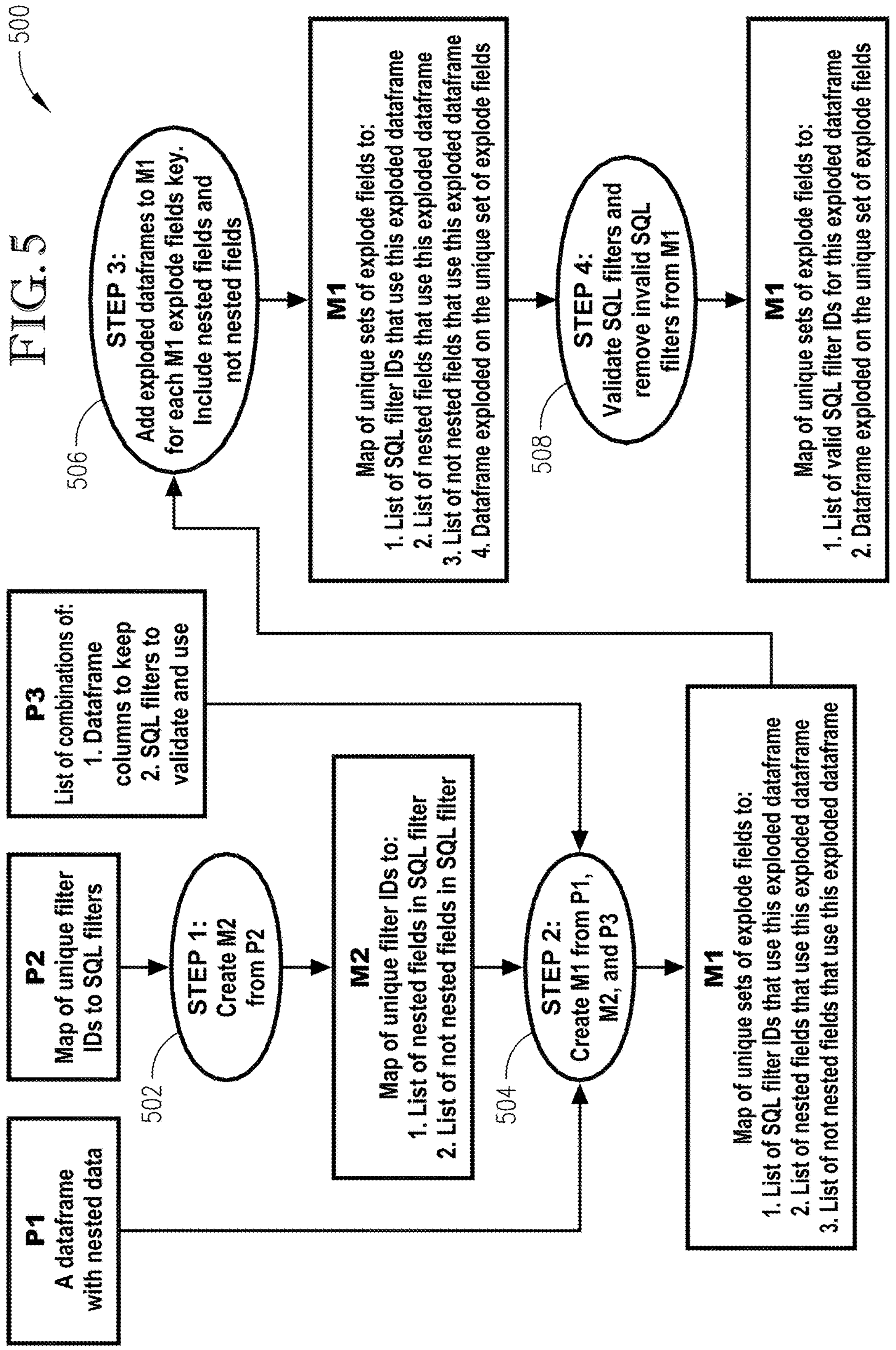
FIG. 5 is a flowchart that illustrates another exemplary computer-implemented method for extracting data from and validating query filters to be applied to nested dataframes in accordance with an exemplary embodiment of the present disclosure, which may be an exemplary embodiment of the computer-implemented method illustrated in FIGS. 4A-4C.

FIG. 5 depict a flowchart that illustrates an exemplary computer-implemented method 500 for extracting data from and validating query filters to be applied to nested dataframes. Computer-implemented method 500 may be one example implementation of computer-implemented method 400 described above with respect to FIGS. 4A-4C.

Computer-implemented method 500 may be performed by one or more components of computer system 100 (shown in FIG. 1), such as server computing device 102.

Computer-implemented method 500 may include creating (block 502) a map (M2) from a map (P2) of unique filter IDs to SQL filters. The map (M2) may include a mapping of unique filter IDs to (1) a list of nested fields in the SQL filter and (2) a list of non-nested fields in the SQL filter.

Computer-implemented method 500 may further include creating (block 504) a map (M1) from map (M2), a dataframe (P1) with nested data, and a list (P3) of combinations of (1) dataframe columns to keep and (2) SQL filters to validate and use. The map (M1) may include a mapping of unique sets of explode fields to (1) a list of SQL filter IDs that use this exploded dataframe, (2) a list of nested fields that use this exploded dataframe, and (3) a list of non-nested fields that use this exploded dataframe.

Computer-implemented method 500 may further include adding (block 506) exploded dataframes to the map (M1) using nested and non-nested fields. After the dataframes are added, the map (M1) further includes a mapping of the unique sets of explode fields to the corresponding dataframe exploded on the unique sets of explode fields.

Computer-implemented method 500 may further include validating (block 508) SQL filters and removing invalid SQL filters from the map (M1). As a result of this validating, the map (M1) may include (1) a list of valid SQL filter IDs for each exploded dataframe and (2) each dataframe exploded on the unique set of explode fields.

Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

In some embodiments, server computing device 102 is configured to implement machine learning, such that server computing device 102 "learns" to analyze, organize, and/or process data without being explicitly programmed. Machine learning may be implemented through machine learning ("ML") methods and algorithms ("ML methods and algorithms"). In one exemplary embodiment, a machine learning module ("ML module") is configured to implement ML methods and algorithms. In some embodiments, ML methods and algorithms are applied to data inputs and generate machine learning outputs ("ML outputs"). ML outputs may include but are not limited to predictions, recommendations, scores (e.g., insurance premium amounts) calculated based upon the input data. In some embodiments, data inputs may include certain ML outputs.

In some embodiments, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, the ML module employs supervised learning, which involves identifying patterns in existing data to make predictions about subsequently received data. Specifically, the ML module is "trained" using training data, which includes example inputs and associated example outputs. Based upon the training data, the ML module may generate a predictive function which maps outputs to inputs and may utilize the predictive function to generate ML outputs based upon data inputs. The example inputs and example outputs of the training data may include any of the data inputs or ML outputs described above. In the exemplary embodiment, a processing element may be trained by providing it with a large sample of conversation data with known characteristics or features. Such information may include, for example, information associated with a plurality of different speaking styles and accents.

In another embodiment, a ML module may employ unsupervised learning, which involves finding meaningful relationships in unorganized data. Unlike supervised learning, unsupervised learning does not involve user-initiated training based upon example inputs with associated outputs. Rather, in unsupervised learning, the ML module may organize unlabeled data according to a relationship determined by at least one ML method/algorithm employed by the ML module. Unorganized data may include any combination of data inputs and/or ML outputs as described above.

In yet another embodiment, a ML module may employ reinforcement learning, which involves optimizing outputs based upon feedback from a reward signal. Specifically, the ML module may receive a user-defined reward signal definition, receive a data input, utilize a decision-making model to generate a ML output based upon the data input, receive a reward signal based upon the reward signal definition and the ML output, and alter the decision-making model so as to receive a stronger reward signal for subsequently generated ML outputs. Other types of machine learning may also be employed, including deep or combined learning techniques.

Based upon these analyses, the processing element may learn how to identify characteristics and patterns that may then be applied to analyzing data.

In some embodiments, the voice bots or chatbots discussed herein may be configured to utilize AI and/or ML techniques. For instance, the voice bot or chatbot may be a ChatGPT chatbot. The voice bot or chatbot may employ supervised or unsupervised machine learning techniques, which may be followed by and/or used in conjunction with reinforced or reinforcement learning techniques. The voice bot or chatbot may employ the techniques utilized for ChatGPT. The voice bot or chatbot may deliver various types of output for user consumption in certain embodiments, such as verbal or audible output, a dialogue output, text or textual output (such text or graphics presented on a computer or mobile device screen or display), visual or graphical output, and/or other types of outputs.

For the purposes of this discussion, a chatbot or chatterbot is a software application used to conduct an online chat conversation via text or text-to-speech, in lieu of providing direct contact with a live human agent. Chatbots are computer programs that are capable of maintaining a conversation with a user in natural language, understanding their intent, and replying based upon preset rules and data, and may be designed to convincingly simulate the way a human would behave as a conversational partner.

Chatbots are used in dialog systems for various purposes including customer service, request routing, or information gathering. While some chatbot applications use extensive word-classification processes, natural-language processors, and sophisticated AI, others simply scan for general keywords and generate responses using common phrases obtained from an associated library or database.

Most chatbots are accessed on-line via website popups or through virtual assistants. They can be classified into usage categories that include: commerce (e-commerce via chat), education, entertainment, finance, health, news, and productivity.

For the purposes of this discussion, ChatGPT is an artificial intelligence chatbot. It is built on a family of large language models and has been fine-tuned (an approach to transfer learning) using both supervised and reinforcement learning techniques. ChatGPT is a member of the generative pre-trained transformer (GPT) family of language models. It was fine-tuned (an approach to transfer learning) over previous versions. The fine-tuning process leveraged both supervised learning as well as reinforcement learning in a process called reinforcement learning from human feedback (RLHF). Both approaches used human trainers to improve the model's performance. In the case of supervised learning, the model was provided with conversations in which the trainers played both sides: the user and the AI assistant. In the reinforcement learning step, human trainers first ranked responses that the model had created in a previous conversation. These rankings were used to create 'reward models' that the model was further fine-tuned on using several iterations of Proximal Policy Optimization (PPO). Proximal Policy Optimization algorithms present a cost-effective benefit to trust region policy optimization algorithms; they negate many of the computationally expensive operations with faster performance. In addition, chatbots similar to and including ChatGPT continue to gather data from users that could be used to further train and fine-tune the chatbot. Users can upvote or downvote responses they receive from ChatGPT and fill out a text field with additional feedback. The reward model of ChatGPT, designed around human oversight, can be over-optimized and thus hinder performance.

Although the core function of a chatbot is to mimic a human conversationalist, ChatGPT represents a type of chatbot that is versatile. For example, it can write and debug computer programs, compose music, teleplays, fairy tales, and student essays; answer test questions (sometimes, depending on the test, at a level above the average human test-taker); write poetry and song lyrics; emulate a Linux system; simulate an entire chat room; play games like tic-tac-toe; and simulate an ATM. ChatGPT training data includes many pages and information about internet phenomena and programming languages, such as bulletin board systems and the Python programming language.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, in other words, an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process may be practiced independent and separate from other components and processes described herein. Each component and process may also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A computing device for extracting data from and validating query filters to be applied to nested dataframes, the computing device comprising at least one processor in communication with at least one memory device, the at least one processor configured to:

receive an input defining (i) at least one specified dataframe, (ii) one or more query filters, and (iii) one or more sets of one or more columns, each of the one or more sets of the one or more columns associated with at least one of the one or more query filters;

generate a first map including, for each query filter of the one or more query filters, a first mapping identifying (i) a list of non-nested columns of the at least one specified dataframe associated with the query filter, and (ii) a list of nested columns of the at least one specified dataframe associated with the query filter;

generate, based in part upon the first map, a second map including, for each set of the one or more sets of the one or more columns, a second mapping including (i) the one or more query filters associated with the set, (ii) a list of non-nested columns associated with the set or with the one or more query filters associated with the set, and (iii) a list of nested columns associated with the one or more query filters associated with the set;

for each second mapping, generate an exploded dataframe from the at least one specified dataframe at least in part by exploding at least one nested column from the list of nested columns corresponding to the second mapping; and cause the exploded dataframe generated for each second mapping to be displayed.

2. The computing device of claim 1, wherein the at least one processor is further configured to:

identify one or more invalid filters of the one or more query filters based upon the generated exploded dataframe; and for each second mapping including the identified one or more invalid filters, remove the identified one or more invalid filters.

3. The computing device of claim 2, wherein the at least one processor is further configured to cause the identified one or more invalid filters to be displayed.

4. The computing device of claim 1, wherein the at least one processor is further configured to:

identify at least one key for each second mapping based upon the list of nested columns, wherein the generated exploded dataframe generated for each second mapping is exploded based upon the identified at least one key; and cause the identified at least one key to be displayed for each exploded dataframe.

5. The computing device of claim 1, wherein the at least one processor is further configured to cause the one or more query filters associated with each exploded dataframe to be displayed.

6. The computing device of claim 1, wherein the at least one processor is configured to generate each exploded dataframe by exploding one nested column.

7. The computing device of claim 6, wherein the at least one processor is further configured to generate each exploded dataframe by applying the one or more query filters associated with the exploded dataframe to the exploded nested column.

8. The computing device of claim 1, wherein the at least one processor is in communication with a client computing device, and wherein the at least one processor is configured to:

receive the input from the client computing device; and transmit data to the client computing device to cause the exploded dataframe generated for each second mapping to be displayed by the client computing device.

9. A computer-implemented method for extracting data from and validating query filters to be applied to nested dataframes, the computer-implemented method performed by at least one processor in communication with at least one memory device, the computer-implemented method comprising:

receiving, by the at least one processor, an input defining (i) at least one specified dataframe, (ii) one or more query filters, and (iii) one or more sets of one or more columns, each of the one or more sets of the one or more columns associated with at least one of the one or more query filters;

generating, by the at least one processor, a first map including, for each query filter of the one or more query filters, a first mapping identifying (i) a list of non-nested columns of the at least one specified dataframe associated with the query filter, and (ii) a list of nested columns of the at least one specified dataframe associated with the query filter;

generating, by the at least one processor, based in part upon the first map, a second map including, for each set of the one or more sets of the one or more columns, a second mapping including (i) the one or more query filters associated with the set, (ii) a list of non-nested columns associated with the set or with the one or more query filters associated with the set, and (iii) a list of nested columns associated with the one or more query filters associated with the set;

for each second mapping, generating, by the at least one processor, an exploded dataframe from the at least one specified dataframe at least in part by exploding at least one nested column from the list of nested columns corresponding to the second mapping; and causing, by the at least one processor, the exploded dataframe generated for each second mapping to be displayed.

10. The computer-implemented method of claim 9, further comprising:

identifying, by the at least one processor, one or more invalid filters of the one or more query filters based upon the generated exploded dataframe; and for each second mapping including the identified one or more invalid filters, removing, by the at least one processor, the identified one or more invalid filters.

11. The computer-implemented method of claim 10, further comprising causing, by the at least one processor, the identified one or more invalid filters to be displayed.

12. The computer-implemented method of claim 9, further comprising:

identifying, by the at least one processor, at least one key for each second mapping based upon the list of nested columns, wherein the generated exploded dataframe generated for each second mapping is exploded based upon the identified at least one key; and causing, by the at least one processor, the identified at least one key to be displayed for each exploded dataframe.

13. The computer-implemented method of claim 9, further comprising causing, by the at least one processor, the one or more query filters associated with each exploded dataframe to be displayed.

14. The computer-implemented method of claim 9, further comprising generating, by the at least one processor, each exploded dataframe by exploding one nested column.

15. The computer-implemented method of claim 14, further comprising generating, by the at least one processor, each exploded dataframe by applying the one or more query filters associated with the exploded dataframe to the exploded nested column.

16. The computer-implemented method of claim 9, wherein the at least one processor is in communication with a client computing device, and wherein the computer-implemented method further comprises:

receiving, by the at least one processor, the query from the client computing device; and transmitting, by the at least one processor, data to the client computing device to cause the exploded dataframe generated for each second mapping to be displayed by the client computing device.

17. At least one non-transitory computer-readable media having computer-executable instructions embodied thereon for extracting data from and validating query filters to be applied to nested dataframes, wherein when executed by at least one processor in communication with at least one memory device, the computer-executable instructions cause the at least one processor to:

receive an input defining (i) at least one specified dataframe, (ii) one or more query filters, and (iii) one or more sets of one or more columns, each of the one or more sets of the one or more columns associated with at least one of the one or more query filters;

generate a first map including, for each query filter of the one or more query filters, a first mapping identifying (i) a list of non-nested columns of the at least one specified dataframe associated with the query filter, and (ii) a list of nested columns of the at least one specified dataframe associated with the query filter;

generate, based in part upon the first map, a second map including, for each set of the one or more sets of the one or more columns, a second mapping including (i) the one or more query filters associated with the set, (ii) a list of non-nested columns associated with the set or with the one or more query filters associated with the set, and (iii) a list of nested columns associated with the one or more query filters associated with the set;

for each second mapping, generate an exploded dataframe from the at least one specified dataframe at least in part by exploding at least one nested column from the list of nested columns corresponding to the second mapping; and cause the exploded dataframe generated for each second mapping to be displayed.

18. The at least one non-transitory computer-readable media of claim 17, wherein the computer-executable instructions further cause the at least one processor to:

identify one or more invalid filters of the one or more query filters based upon the generated exploded dataframe; and for each second mapping including the identified one or more invalid filters, remove the identified one or more invalid filters.

19. The at least one non-transitory computer-readable media of claim 18, wherein the computer-executable instructions further cause the at least one processor to cause the identified one or more invalid filters to be displayed.

20. The at least one non-transitory computer-readable media of claim 17, wherein the computer-executable instructions further cause the at least one processor to:

identify at least one key for each second mapping based upon the list of nested columns, wherein the generated exploded dataframe generated for each second mapping is exploded based upon the identified at least one key; and cause the identified at least one key to be displayed for each exploded dataframe.

* * * * *